United States Patent [19]

Green

[11] 4,040,324

[45] Aug. 9, 1977

[54] CHORD INDICATOR FOR INSTRUMENTS HAVING ORGAN AND PIANO-TYPE KEYBOARDS

[76] Inventor: Harry Green, 11848 - 99 Ave., Surrey, British Columbia, Canada

[21] Appl. No.: 676,243

[22] Filed: Apr. 12, 1976

[51] Int. Cl.² .............................................. G09B 15/00
[52] U.S. Cl. .................................................... 84/478
[58] Field of Search ................. 84/470, 471, 477, 478, 84/479

[56] References Cited

U.S. PATENT DOCUMENTS

| 2,820,391 | 1/1958 | Janssen et al. | 84/478 X |
| 3,335,630 | 8/1967 | Schmoyer | 84/478 |
| 3,415,152 | 12/1968 | Gullickson | 84/478 |
| 3,460,426 | 8/1969 | Jensen | 84/478 |

*Primary Examiner*—Lawrence R. Franklin
*Attorney, Agent, or Firm*—Carver and Company

[57] ABSTRACT

A chord indicator for keyboard instruments comprises an elongated panel having lights therein which will be aligned with each key when the panel is placed adjacent the keyboard. Two rows of lights are provided, one indicated the white keys and the black keys as sharps and the other indicating the black keys as flats. A chord selector mechanism comprises a base having spaced contacts thereon corresponding to the lights on the panel and a carriage movable along the base having contacts corresponding to the notes of selected chords. Chord selector switches permit selection of the type of chord to be displayed and the location of the carriage on the base permits selection of the root note of the chord. Electrical means permit the chord to be indicated as having either sharps or flats as appropriate for the selected chord. In use a chord type is selected, a root note is selected, and the lights on the panel aligned with the keys corresponding to the notes of the selected chord will be illuminated.

4 Claims, 9 Drawing Figures

4,040,324

CHORD INDICATOR FOR INSTRUMENTS HAVING ORGAN AND PIANO-TYPE KEYBOARDS

BACKGROUND OF THE INVENTION

1. Field of the Invention

This invention relates to teaching aids for instruments having an organ or piano-type keyboard particularly with respect to the playing of chords.

2. Prior Art

In written music for instruments having an organ or piano-type keyboard, wherein a chord signature for the left hand simply indicates the root note of the chord and the type of chord to be played, an instructor must indicate to a pupil the keys to be played in order to obtain the proper chord. When the instructor is not present the pupil must continually refer to the prepared charts to ascertain the correct keys to be played. To provide greater effectiveness in speed of instruction, chord indicating devices have been heretofore devised using a panel provided with indicating lights which can be arranged on or over the keys of the instrument and which can be operated remotely to indicate the notes the pupil must play. Prior art devices of this nature have been devised for operation only by the instructor, who energizes the panel lights through operation of appropriate switches. These types of devices are, therefore, not of any use to a pupil when the instructor is not present. Such prior art devices are also defficient in that although they do indicate proper notes to be played, they do not indicate whether or not the black keys played are flats or sharps.

SUMMARY OF THE INVENTION

The present invention provides a chord teaching aid for organ and piano-type instruments which can be easily and quickly operated by the pupil himself, and which indicates to the pupil whether or not the black keys played are sharps or flats.

The teaching aid of the present invention can also be operated by the pupil himself to indicate what keys he must play to obtain first and second inversions of the selected chords.

The indicator of the present invention has an indicating panel adapted to be positioned on the keyboard of an organ or piano-type instrument having a first row of electric lights spaced and disposed for indicating all of the instrument keys over at least two octaves and a second row of lights parallel to the first row, each light of the second row being located adjacent the lights of the first row indicating the black keys when the panel is located so that the first light of the first row indicates the C key of the instrument. The apparatus also includes a base plate located remotely from the light panel having a row of contact elements equal in number to the lights of the first row which are individually connected in order of ascendency to the hot side of each of the lights. The lights of the first row, representing the white keys, are individually grounded and the lights of the first and second rows, representing the black keys, are individually grounded through a relay operated switch which in a de-energized condition connects only the lights of the first row, representing the black keys, to ground and which in an energized condition connects only the lights of the second row to ground. A carriage is mounted on the base plate for slidable movement longitudinally of the row of contact elements and has a row of carriage contact elements slidably contacting the contact elements of the base plate. The carriage contact elements are equal in number to the total number of notes required to play a selected number of chords of an octave, and so located that at any position of the carriage on the base plate said carriage contact elements contact the base plate elements connected to the electric lights, representing said total number of notes of an octave. The carrige has a plurality of chord selector switches equal in number to the said selected chords, each chord selecting switch being adapted when operated to connect the appropriate contact elements of the carriage representing the chords connected by the chord selector switch to a source of electric power so as to energize lights of the first row representing keys of the chords selected. The carriage also has switch means operated when each chord selector switch is moved to a second position to energize the relay switch and thus connect the lights of the second row to ground only when the carriage is located in a position in which the first contact element of the carriage contacts the base plate contact element representing a key in which flats rather than sharps occur.

A detailed description following, related to the drawings, gives exemplification of apparatus according to the invention which, however, is capable of expression in means other than those particularly described and illustrated.

DETAILED DESCRIPTION

Figure 1:
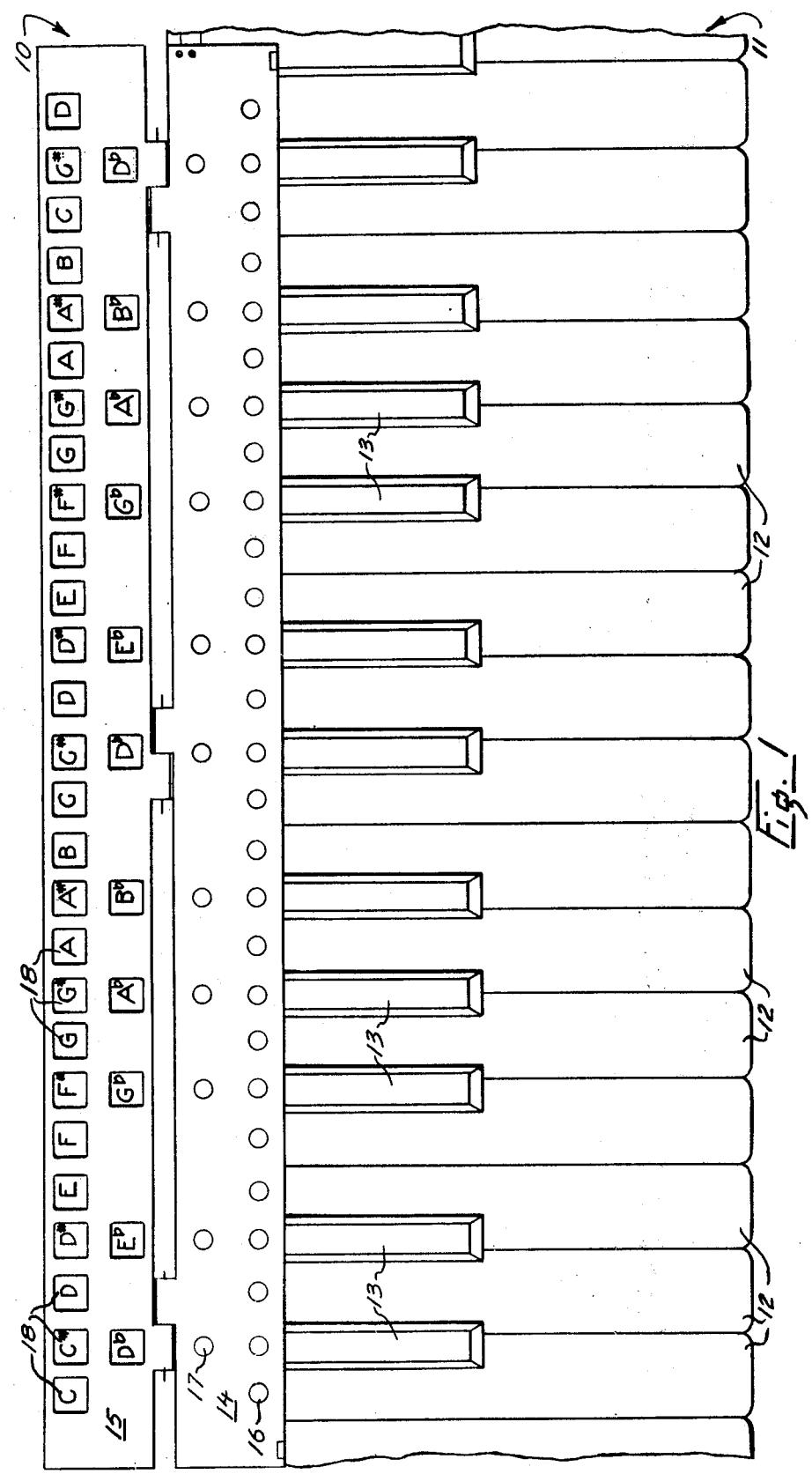
FIG. 1 is a plan view of an indicator panel of the invention arranged on an organ or piano keyboard (shown only partially)

FIG. 1 shows an indicator panel 10 which is a part of the chord indicator located on an organ keyboard, generally 11, white keys of the keyboard being indicated with the numerals 12 and the black keys being indicated with the numerals 13. The indicator panel has an elongated lower plate 14 on which is hingedly mounted a cover plate 15. A first row of electric lights 16, which are twenty-seven in number, and which are spaced apart corresponding to key spacing of the instrument so that with the first light being positioned over the key of C in the instrument, the remainder of the lights are aligned with instrument keys. The instrument panel also has a second row of electric lights 17, being eleven in number, and being disposed so that with the panel positioned on the instrument as aforesaid, each electric light 17 is aligned with a black key of the instrument. The cover plate 15 has a plurality of opaque windows, severally 18, so located that with the cover plate 15 over the lower plate 14, each light is positioned beneath a window. The windows bear indicia, which are reversed for illustrative purposes, showing which key each light represents. The indicia on those windows over each of the lights of the first row representing black keys indicate that the black key is a sharp, while corresponding indicia on the windows of the second row indicate that the black keys are flats. For example, the fourth window of the second row, reading from the left, indicates that the black key is a flat, while the corresponding window over the first row of lights indicates that the same key is a sharp.

The indicator panel is constructed of very light material, for instance thin sheet metal so that when it is placed on the keys, its weight is not sufficient to result in depression of the keys.

The lights are connected by leads (not shown) to a chord selector assembly, generally 19, as shown in FIGS. These 2 through 8, and which is arranged when operated to energize those lights of the indicator panel representing the instrument keys to be played to obtain major, minor, seventh, augmented and diminished chords in any key together with first and second inversions thereof. THese chords have been selected as they are chords most commonly used.

Figure 2:
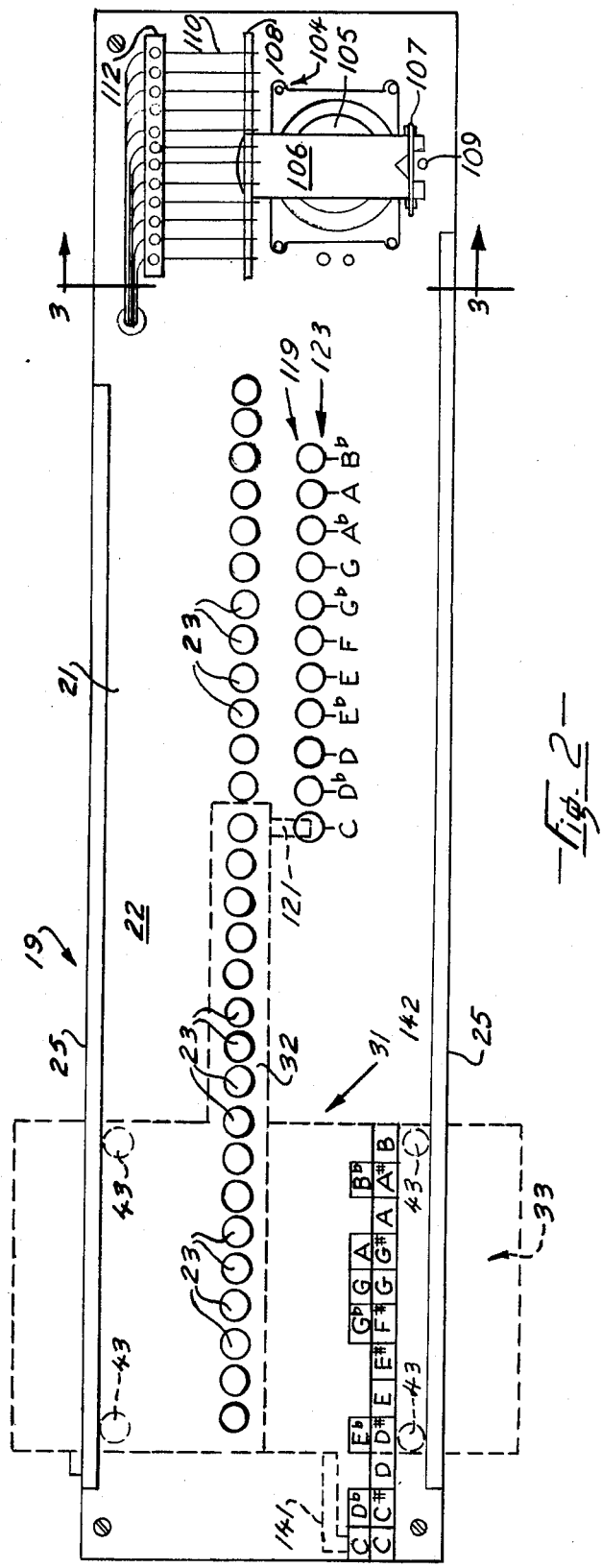
FIG. 2 is a plan view of the base plate shown in solid outline, and a carriage shown in broken outline.
Figure 8:
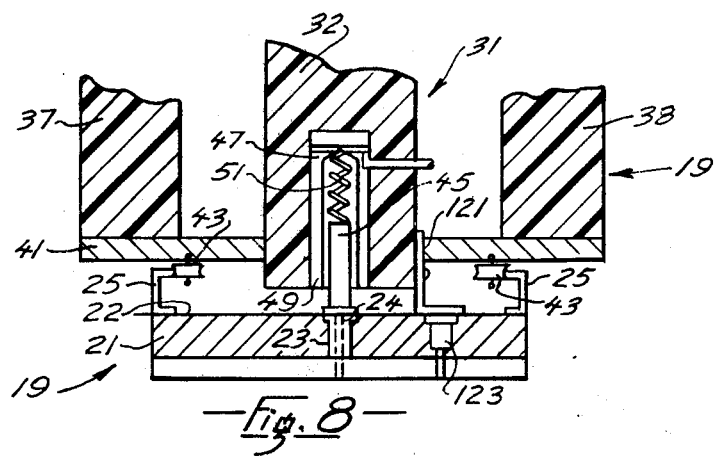
FIG. 8 is a transverse sectional view of a portion of the carriage and base.

Referring particularly to FIGS. 2 and 8, the chord selector assembly 19 has an elongated base 21 which is formed of a dielectric material, for example a suitable thermoplastic, having a flat upper surface 22. A row of contact elements, severally 23, are spaced apart at uniformly spaced intervals on the base. As shown in FIG. 8, each contact element is inset into the base and has a flat upper surface 24, FIG. 8, which is flush with the flat upper surface of the base. The contact elements 23, are 27 in number, and each is connected in order of ascendency from left to right to corresponding indicator lights of the first and second rows of the indicator panel 10 in a manner hereinafter to be described.

A pair of parallel tracks 25-25 are mounted on the base 21 extending in opposite sides of the contact element 23 and one of the tracks is connected to a source of electric power from either battery or conventional wall receptacle with voltage suitably reduced.

A chord selector carriage 31 is mounted on the tracks for movement longitudinally of the base. The carriage, see FIGS. 2, 4, 5, 6, 7 and 8, has a central supporting arm 32 which is made of a suitable dielectric material, the arm having a tank 33 mounted thereon. The tank has a pair of parallel spaced apart metalic end plates 34 and 35 which are secured by screws 36 to the supporting arm 32. A pair of side blocks 37 and 38, which are formed of a dielectric material, are secured by screws 39 between opposite ends of the end plates. A metallic bottom plate 41, FIG. 8, is secured between each side block and the supporting arm and contacts the metallic end plates. The tank also has a cover 42, FIG. 4, which can be made of suitable dielectric material. Metal wheels 43, which are mounted on the bottom plate 41, rollably engage the track 25 so that it is seen the metallic end plates 34 and 35 are each in contact with the positive side of the source of electric power.

The supporting arm 32 is provided with a row of sliding contact elements generally 45, which are aligned with the row of base contact elements 23. As shown in FIG. 8, wherein one of the contact elements 45 is shown, each element fits in a metallic socket 47 which is embedded in the supporting arm and each element is outwardly urged by a spring 51 so that as the carriage moves longitudinally over the base the elements 45 slidably contact the contact element 23. The sliding contact elements are so spaced apart in relation to the spacing of the contact elements 23 that with the first sliding contact element, reading from the left, positioned over any one of the contact elements 23 the rest of the sliding contact elements engage the fourth, fifth, seventh, eighth, ninth, tenth, eleventh, thirteenth, sixteenth and seventeenth contact elements 23, reading from the first element 23 contacted by the first sliding contact element. The sliding contact elements are appropriately referenced with the prefix C followed by the position of the contact element 23 which each engages. It is seen therefore that the sliding contact C1 through C11 represent the total number of organ keys used in playing all of the chords of those selected, as previously mentioned. The sliding contact C13 represents the first inversion of any chord while the sliding contact C16 represents the second inversion of minor and diminish chords while sliding contact C17 represents the second inversion of major, seventh and augmented chords.

Figure 4:
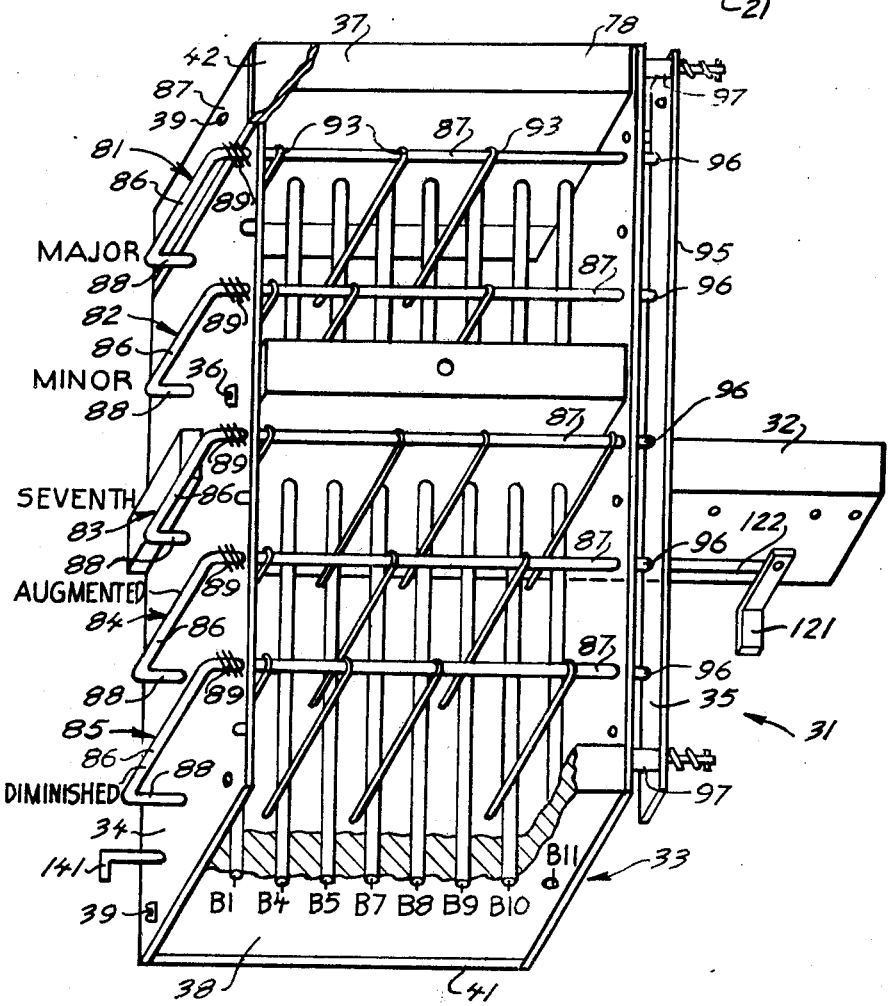
FIG. 4 is an isometric view of the carriage.
Figure 9:
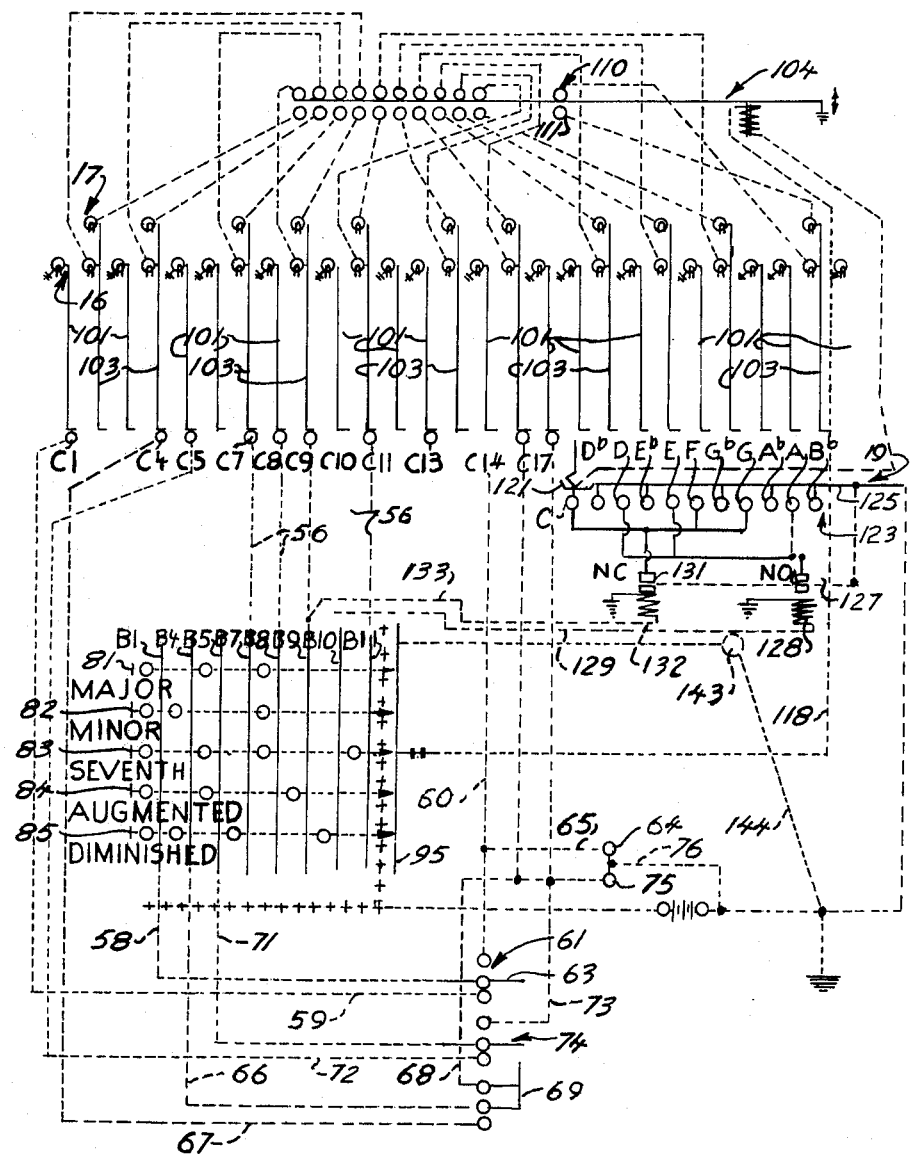
FIG. 9 is a schematic wiring diagram of the indicator.

The tank supports a chord selector switch assembly, which comprises eight contact bars referenced, reading from left to right on FIG. 4, as B1, B4, B5, B7, B8, B10 and B11. The bars are disposed in spaced parallelism and extend through the central supporting arm and are embedded in the side blocks 37 and 38. With reference to FIG. 9, contact bars B7, B8, B9, B10 and B11 are connected by leads 56 to sliding contacts C7, C8, C9, C10 and C11, respectively. Contact bar B1 is connected by leads 58, 59 and 60 through a two-pole manually operated switch 61 to sliding contacts C1 and C13. The switch 61 has a manually operated lever arm 63 for selectively connecting either of the sliding contact C1 and C13 to the contact bar B1. An indicator light 64 connected by a lead 65 from lead 60 to ground gives evidence of connection of bar B1 and sliding contact C13.

Bar B4 is similarly connected to sliding contact C4 and C16 by leads 66, 67 and 68 through a manually operated switch 69 and bar B5 is similarly connected to sliding contacts C5 and C17 by leads 71, 72 and 73 through the manually operated switch 74. Both switches are tied and trip together. An indicator light 75 connected by a lead 76 from leads 68 and 73 to ground affords evidence of connection of sliding contacts C16 and C17 to contact bars B4 and B5, respectively. The switches 63, 69 and 74 together with indicator lights 64 and 75 are mounted on the cover of the tank as shown in FIG. 5 and indicated only by the numerals 63 and 64 respectively.

Figure 5:
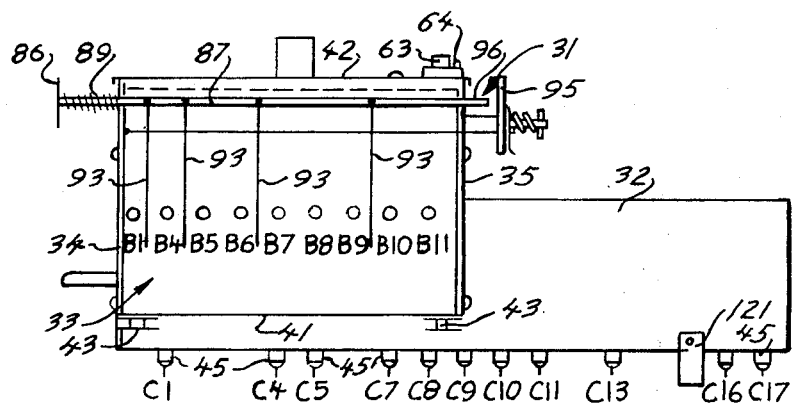
FIGS. 5, 6 and 7 are a side view, plan view and underside view of the carriage, respectively, some portions being removed for clarity.
Figure 6:
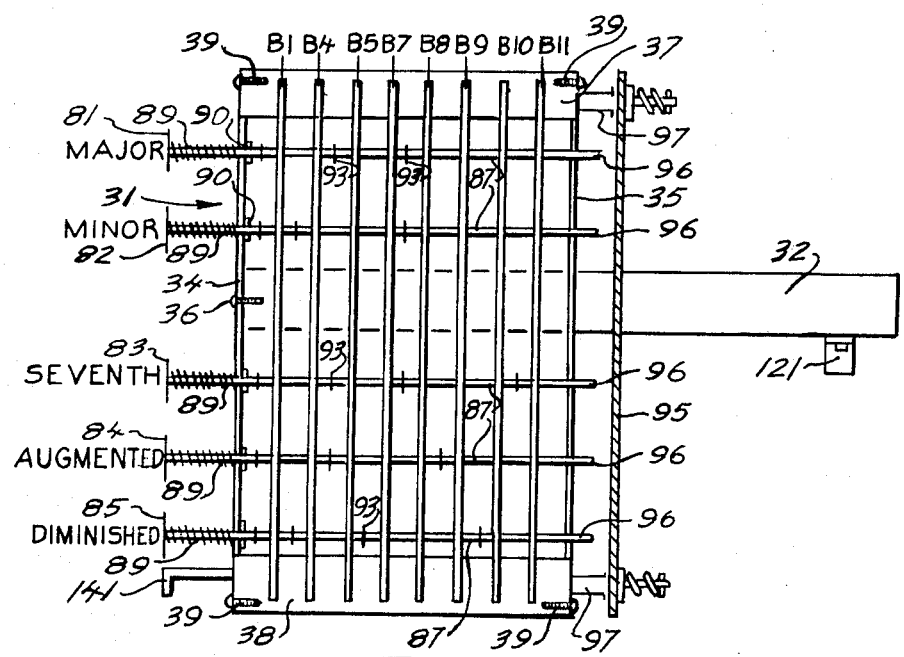
Figure 7:
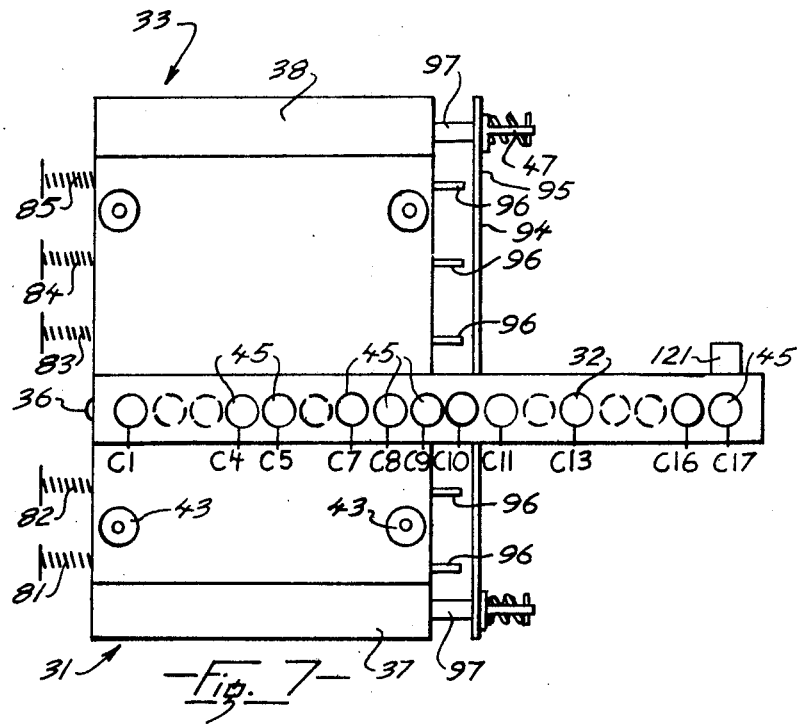

The tank, see FIGS. 4, 5 and 6, has a plurality of chord selector push-rods 81, 82, 83, 84 and 85, one for each of the selected chords, each of the push-rods being designated with the chord that it represents. Each push-rod is U-shaped having a handle portion 86, a long leg 87 which slidably extends through the plates 34 and 35, and a short leg 88 which slidably extends through the plate 34, so as to prevent the push-rods from rotating. Compression springs 89 between the handle portions and the plate 34 slidably urge the push-rods outwards to a normally extended position limited by the engagement of a stop 90 with the plate 34. The long leg 87 of each of the push-rods has metal spring contact fingers 93 mounted thereon which extend between adjacent pairs of the contact bars B1 through B11 as shown in FIGS. 4, 5, 6 and 9. The push-rod for diminished chords has four of the spring fingers 93 which are so located that when the push-rod 85 is moved inwardly against its spring, they make contact with contact bars B1, B4, B7 nd B10. The position of the fingers 93 relative to the contact bars for the rest of the push-rods is evident. The handle portions of the push-rods are covered with a suitable thermoplastic.

A metallic bar 95, hereinafter known as energizing bar, is mounted on the tank adjacent the plate 35 in spaced relation to projecting ends 96 of the push-rods. The bar is mounted on non-conductive pins 97 which extend into the side blocks 37 and 38 of the tank. Spacing of the energizing bar from the projecting ends 96 of the legs 87 of the push-rods is such that when any rod is moved inwards against its spring to obtain engagement of its associated fingers 93 with the associated contact bars, the projecting ends 96 are still spaced from the energizing bar 95 thus providing for a certain amount of lost motion of the push-rods before the legs 87 make contact with the energizing bar, such lost motion being obtained by deflection of the fingers 93 while still in contact with their associated contact bars. As the metallic legs 87 of the push-rods are in contact with the positive side of the elgs' source of power, an operator can therefore selectively energize the contact bars alone or energize the contact bars and the energizing bar.

Referring to FIG. 9, each of the panel indicator lights associated with a white instrument key is connected to the associated one of the contact elements 23 by a lead 101 and each of the white key indicator lights is grounded separately. Each pair of indicator lights of the first and second row of the panel, representing a black key, is connected by a lead 103 to their associated contact elements of the row 23.

Figure 3:
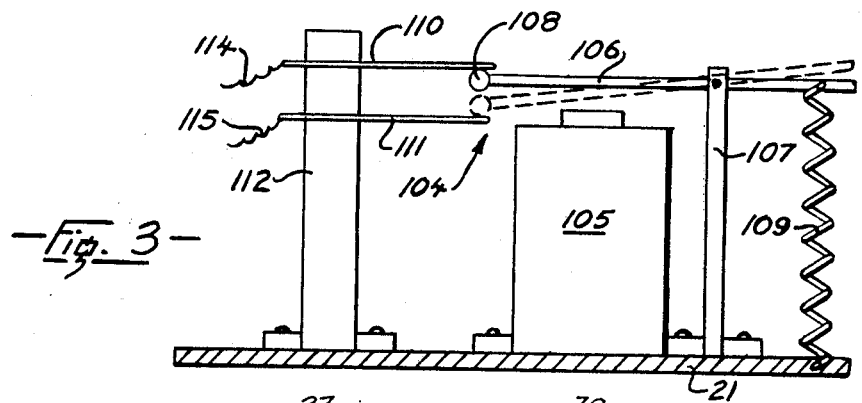
FIG. 3 is an enlarged sectional view taken on Line 3—3 of FIG. 2.

The black key indicator lights of the first row, as one group, and the black key indicator lights of the second row, as a second group, are connected to ground through a relay switch 104 which is so arranged that either group can selectively be grounded. As shown in FIG. 9, and with reference to FIGS. 2 and 3, the relay switch 104 which is situated at one end of the base has an electromagnet 105 mounted on the base and an armature 106 which is hingedly mounted on a stanchion 107 connected to the base. The armature has a contact rod 108 at one end and a tension spring 109 connected between the base and its opposite end normally urging the armature away from the electromagnet. The contact rod 108 extends between two batteries 110 and 111 of spring contact elements which are mounted in a dielectric block 112 mounted on the base. The indicator lights of the first row of lights are connected by leads 114 to the battery of spring contact elements 110, and leads 115 connect the black key indicator lights of the second row to the battery of spring contact elements 111. As shown in FIG. 3, with the electromagnet in its normal unenergized condition, the contact rod 108 is normally urged by action of the spring 109 into engagement with the battery of contacts 110, position shown in solid outline. Energizing of the electromagnet results in movement of the rod 108 into contact with the battery of contacts 111, the position shown in broken outline.

The electromagnet 105 is connectable to the positive side of the electric power source by a lead 118 extending to the energizing bar 95 and is connectable to ground through a flat selector switch assembly, generally 119, portions of which are seen in FIG. 2, and diagramatically in FIG. 9. The assembly 119 has a metal contact shoe 121 which is secured to and extends below the central supporting arm 32 of the carriage. The contact shoe 121, also referenced in FIGS. 5, 6, 7 and 8, is connected by a lead 122 to the ground side of the electromagnet 105 and is adapted to make sliding contact, as the carriage is moved over the rails, with a row of contact elements 123 which are inset in the base. The contact elements 123, which are eleven in number, have the same interval spacing as the contacts 23 and are positioned so that each is contacted in turn by the shoe 121 when the carriage is moved to position the carriage contact element C1, in turn, over the first eleven contact elements 23. The contact elements 123 are therefore accorded the key nomenclature corresponding to the key nomenclature of the corresponding contact element 23.

As seen in FIG. 9, the contact elements 123 which are referenced "D flat," "E flat," "G flat," "A flat" and "B flat" are all connected through a common lead 125 to ground. The contact elements 123 which are referenced D, E and A are all connected to the common ground lead 125 through a normally open relay switch 127 the electromagnet 128 of which is connected at one side to ground and on its other side by lead 129 to contact bar B10. Those contact elements 123 which represent the keys of C, F and G are connected to the common ground lead 125 through a normally closed relay switch 131 which has an electromagnet 132 connected at one side to ground and at the other side, by a lead 133, to the carriage contact bar B9.

Position of the carriage on the base plate relative to the root note of the chord desired to be indicated is indicated by the position of a pointer 141, see FIG. 2, which is secured to the carriage, relative to a scale 142 imprinted upon the base plate. The scale 142 bears key indicia ranging in half notes from C to B so that by positioning the carriage with the pointer indicating a key the carriage contact C1 is located over the appropriate one of the contact elements 23.

Evidence of connection of the electromagnet 105 to the positive side of the electric power source is provided by means of an indicator light 143 connected in a lead 144 extending from the energizing bar to ground.

In operation of the chord selector assembly, the panel 10 is positioned on the instrument keys with the first key indicator light aligned with the C key of the instrument, conventionally C of the second chord below middle C. The base carrying the carriage can be positioned on the instrument in a location suitable for the operation.

The carriage is then positioned longitudinally of the base so that the indicia of the scale 142, as referenced by the pointer, corresponds with the root note of the chord to be played. Depending on the nature of the chord, the appropriate push-rod is then fully depressed against its spring and into contact with the energizing bar. At the same time the spring fingers of the depressed push-rod make contact with the appropriate contact bars, thus energizing only those grounded indicator lights of the first or second row of the indicator panel which are connected through the contact bars and their associated contact elements 23, to the source of electric power.

It is seen that with the carriage located to obtain chords in "D flat," "E flat," "G flat," "A flat" and "B flat" contact of any of the push-rods with the relay energizing bar will result in energizing of the relay switch 105 and closure of the rod 108 with the battery of spring elements 111. Panel indicator lights of the second row then indicate that any black keys are flats.

For chords in which root notes are C, F and G, as the relay switch 131 is normally closed, the push-rods with the exception of the augmented push-rod will result in closure of the relay switch 105 which would indicate that any black keys are flat. Depression of the augmented push-rod when the carriage is positioned with these keys as chord root notes will result in the opening of the relay switch 131 which will thus prevent closure of the relay switch 105 so that panel indicator lights indicated that any black keys played are sharp.

With respect to chords, the root notes of which are D, E and A, any black keys played in these keys with the exception of those played in diminished chords are sharps. Operation of all of the push-rods other than the diminished push-rod will not result in closure of the relay switch 105 so that, with the exception of diminished chords, all indicator lights will indicate the black keys are sharps. When the diminished chord push-rod is operated the relay switch 127 closes so as to result in energizing of the relay switch 105 to indicate that the black keys played in diminished chords are flat.

First inversions of any chords can be obtained by appropriately operating the switch 61 which connects sliding contact C13 to contact bar B1. Second inversions of minor and dimnished chords can be obtained by appropriately operating switch 69 to connect sliding contact C16 to contact B4 and to disconnect sliding contact C4 therefrom and second inversions of major, seventh and augmented chords can be obtained by appropriate operation of switch 74. A double-pole double-through switch is used for switches 61, 69 and 74 with common trip.

It is to be understood that although in the description of the teaching aid, the relay switch assembly and the chord selector assembly of the carriage have been described as being of a mechanical nature, solid state components can be used in each of the assemblies, consequently, the claims hereinafter appended shall be read accordingly.

I claim:

1. A chord teaching aid for instruments having a piano or organ-type keyboard adapted to be connected to a source of electric power, said aid including:
   a. an indicator panel having a first row of lights adapted to be aligned with the keys of the instrument extending over two octaves,
   b. the lights representing the black keys indicating the black keys as sharps,
   c. a second row of electric lights on the indicator panel representing only the black keys indicating the black keys are flats,
   d. lead means separately grounding each of the indicator lights representing white keys,
   e. electrically operated relay switch means connectable to the power source adapted when in a deenergized condition for connecting all the indicator lights of the first row representing black keys to ground, and in an energized condition adapted to connect only the indicator lights of the second row indicating that the black keys are flats to ground,
   f. a chord selector assembly operable remote from the indicator panel for connecting the indicator lights to the source of electric power, said assembly including:
      i. a base plate having a row of base contact elements arranged thereon in equidistantly spaced relationship and equal in number to total number of the first row of indicator lights connecting each of the base contact elements to its associated indicator lights representing a white key and a lead connecting each contact element with its associated indicator light representing a black instrument key,
      ii. a carriage mounted for slidable movement over the base plate longitudinally of the row of spaced contact elements thereon,
      iii. a row of contact elements on the carriage connectable in circuit to the power source for slidably contacting the base contact elements, said carriage contact elements being equal in number to the total number of notes required to be played for the selected chord and being so spaced so that when a first carriage contact element is positioned over any base contact element which represents the chord root note, the remainder of the carriage contact elements contact the base contact elements which represent the total number of notes,
      iv. a plurality of normally open chord selector switches mounted on the carriage for connecting selected carriage contact elements in circuit with one side of the power source, each switch representing one of the selected chords and being adapted when operated from the open to closed position to connect those carriage contact elements representing the notes of any chord selected to the source of electric power so as to energize the indicator lights associated with any of the base contact elements contacted by the carriage contact elements which are connected to the source of power,
   g. flat selector switch means in circuit between the relay switch and the power source for closing the relay switch circuit only when the black key notes of the chord selector are flats.

2. A chord teaching aid as claimed in claim 1 including inversion contact elements mounted in the carriage for contacting those base contact elements which are inversions of the first and second base contact elements representing the first and second notes of any chords played and manually operated switch means on the carriage for selectively connecting either the base contact elements representing the first or second notes of any chord or the inversion thereof to their associated chord selector switches.

3. A chord teaching aid as claimed in claim 1 in which the flat selector switch means includes:
   a. a row of spaced contact points on the base connected to one side of the flat selector relay switch,
   b. a contact shoe on the carriage for contacting each of the contact points in turn when the carriage is positioned to place the first carriage contact element in contact in turn with each of the base contact elements representing the first octave of indicator lights,
   c. a lead connecting the contact shoe to one side of the source of power,
   d. a lead connecting the opposite side of the relay switch in the circuit established by closure of the chord selector switches.

4. A chord teaching aid as claimed in claim 1 in which each chord selector switch includes:
   a. a metallic push-rod mounted in the carriage and connected to the source of power,
   b. a plurality of contact bars mounted in spaced relationship in the carriage, each contact bar representing a carriage contact element,
   c. a lead connecting each contact bar and its associated carriage contact element, c. contact fingers mounted on each push-rod for movement into and out of engagement with the contact bars by manual operation of each push-rod, the contact fingers of each rod being disposed so as to contact only those contact bars which are connected to the carriage contact elements representing the chord notes which each chord selector switch represents.

* * * * *